US007481948B2

(12) United States Patent
Jeffcoate et al.

(10) Patent No.: US 7,481,948 B2
(45) Date of Patent: Jan. 27, 2009

(54) HEAT TRANSFER COMPOSITIONS WITH HIGH ELECTRICAL RESISTANCE FOR FUEL CELL ASSEMBLIES

(75) Inventors: Carol S. Jeffcoate, Danbury, CT (US); Aleksei V. Gershun, Southbury, CT (US); Peter M. Woyciesjes, Woodbury, CT (US); Filipe J. Marinho, Danbury, CT (US)

(73) Assignee: Honeywell International Inc., Morristown, NJ (US)

(*) Notice: Subject to any disclaimer, the term of this patent is extended or adjusted under 35 U.S.C. 154(b) by 336 days.

(21) Appl. No.: 10/370,170

(22) Filed: Feb. 19, 2003

(65) Prior Publication Data

US 2003/0198847 A1 Oct. 23, 2003

Related U.S. Application Data

(60) Provisional application No. 60/358,201, filed on Feb. 19, 2002.

(51) Int. Cl.
*C09K 5/00* (2006.01)

(52) U.S. Cl. ............................ 252/71; 252/73; 252/74; 252/75; 429/20; 429/26; 429/120

(58) Field of Classification Search ....................... None
See application file for complete search history.

(56) References Cited

U.S. PATENT DOCUMENTS 4,182,795 A 1/1980 Baker et al. .................... 429/13
4,260,504 A 4/1981 Tucoulat et al. ............... 252/73
4,344,850 A 8/1982 Grasso ....................... 210/664
4,500,612 A 2/1985 Fujii et al. .................... 429/26
4,704,220 A * 11/1987 Goddard et al. ............... 252/75
4,755,316 A * 7/1988 Magid et al. .................. 252/68
4,900,463 A * 2/1990 Thomas et al. ................ 252/68
5,047,298 A 9/1991 Perry, Jr. et al. ............... 429/17
5,073,283 A 12/1991 Goddard et al. ............... 252/78
5,187,024 A 2/1993 Matsumura .................. 429/24
5,200,278 A 4/1993 Watkins et al. ................ 429/24
5,252,410 A 10/1993 Wilkinson et al. ............ 429/33
5,254,280 A * 10/1993 Thomas et al. ................ 252/68
5,360,679 A 11/1994 Buswell et al. ............... 429/19
5,366,821 A 11/1994 Merritt et al. ................. 429/21
5,409,784 A 4/1995 Bromberg et al. ............. 429/13
5,432,021 A 7/1995 Wilkinson et al. ............ 429/17
5,503,944 A 4/1996 Meyer et al. .................. 429/13
5,518,705 A 5/1996 Buswell et al. ............. 423/437
5,525,436 A 6/1996 Savinell et al. ............... 429/30
5,565,279 A 10/1996 Fredley et al. ................ 429/26
5,599,638 A 2/1997 Surampudi et al. ............ 429/33
5,601,936 A 2/1997 Dudfield et al. ............... 429/13
5,605,770 A 2/1997 Andreoli et al. ............... 429/20
5,631,099 A 5/1997 Hockaday .................... 429/30
5,641,031 A 6/1997 Riemer et al. .............. 180/65.3
5,677,073 A 10/1997 Kawatsu ...................... 429/22
5,714,276 A 2/1998 Okamoto ..................... 429/17
5,804,326 A 9/1998 Chow et al. ................... 429/26
5,837,393 A 11/1998 Okamoto ..................... 429/20
5,868,105 A 2/1999 Evans ........................ 123/41.5
5,985,474 A 11/1999 Chen et al. .................... 429/17
5,991,670 A 11/1999 Mufford et al. ............... 701/22
6,001,499 A 12/1999 Grot et al. ...................... 429/22
6,007,934 A 12/1999 Auer et al. ..................... 429/44
6,045,933 A 4/2000 Okamoto ..................... 429/17
6,048,473 A 4/2000 Denda et al. ................ 252/376
6,053,132 A 4/2000 Evans ........................ 123/41.5
6,063,516 A 5/2000 Grot et al. ...................... 429/22
6,068,943 A 5/2000 Divisek et al. ................ 429/17
6,077,620 A 6/2000 Pettit ........................... 429/26
6,096,448 A 8/2000 Wilkinson et al. ............ 429/13
6,101,988 A 8/2000 Evans ........................ 123/41.5
6,103,411 A 8/2000 Matsubayashi et al. ....... 429/17
6,110,615 A 8/2000 Bloomfield .................. 429/21
6,120,923 A 9/2000 Van Dine et al. .............. 429/17
6,120,925 A 9/2000 Kawatsu et al. ............... 429/40
6,162,267 A 12/2000 Priegnitz et al. .............. 48/199
6,168,772 B1 1/2001 Watanabe ................... 423/247
6,183,896 B1 2/2001 Horita et al. .................. 429/30
6,186,254 B1 2/2001 Mufford et al. ............ 180/65.3
6,187,464 B1 2/2001 Yasumoto et al. ............. 429/13
6,190,791 B1 2/2001 Hornburg .................... 429/17
6,207,308 B1 3/2001 Grasso et al. ................. 429/26
6,207,309 B1 3/2001 Bonville et al. ............... 429/26
6,210,820 B1 4/2001 Knights et al. ................ 429/13
6,210,821 B1 4/2001 Lesieur et al. ................ 429/17
6,218,038 B1 4/2001 Oko et al. ..................... 420/34
6,230,669 B1 5/2001 Evans ........................ 123/41.5
6,234,278 B1 5/2001 Loken et al. ............. 188/70 R
6,238,817 B1 5/2001 Reiser ......................... 429/34
6,242,118 B1 6/2001 Grasso et al. ................. 429/13
6,248,462 B1 6/2001 Bonville ...................... 429/24
6,265,092 B1 7/2001 Meltser et al. ................ 429/12
6,276,473 B1 8/2001 Zur Megede ............... 180/65.2
6,277,508 B1 8/2001 Reiser et al. .................. 429/17
6,280,864 B1 8/2001 Towler et al. ................. 429/17
6,284,399 B1 9/2001 Oko et al. ..................... 429/19
6,287,715 B1 9/2001 Faris et al. .................... 429/22
6,294,277 B1 9/2001 Ueno et al. ................... 429/22
6,294,278 B1 9/2001 Wohr et al. ................... 429/24

(Continued)

FOREIGN PATENT DOCUMENTS

CA 2382930 5/2001

(Continued)

OTHER PUBLICATIONS

The International Search Report of WO 03/070854 A1.

*Primary Examiner*—Necholus Ogden, Jr.

(57) ABSTRACT

The present invention relates generally to heat transfer compositions. More particularly, the present invention relates to heat transfer compositions with high electrical resistance for use in power-generating equipment or in engines. Such compositions are particularly useful in fuel cell assemblies.

15 Claims, No Drawings

U.S. PATENT DOCUMENTS

| | | | |
|---|---|---|---|
| 6,294,280 B1 | 9/2001 | Tanaka et al. | 429/34 |
| 6,316,135 B1 | 11/2001 | Breault et al. | 429/22 |
| 6,432,320 B1 * | 8/2002 | Bonsignore et al. | 252/70 |
| 6,448,535 B1 | 9/2002 | Ap | 219/208 |
| 6,531,243 B2 | 3/2003 | Thom | 429/96 |
| 6,921,593 B2 * | 7/2005 | Pan et al. | 429/2 |

FOREIGN PATENT DOCUMENTS

| | | |
|---|---|---|
| CA | 2430443 | 7/2002 |
| DE | 28 56 964 C | 12/1987 |
| DE | 3836902 A1 | 3/1990 |
| EP | 1102341 A2 | 5/2001 |
| WO | WO 01 23495 A | 5/2001 |
| WO | WO 01/47052 A1 | 6/2001 |
| WO | WO 01/54218 A2 | 7/2001 |
| WO | WO 01/61777 A2 | 8/2001 |
| WO | WO 02/055759 A2 | 7/2002 |
| WO | WO 02/073727 A1 | 9/2002 |

* cited by examiner

HEAT TRANSFER COMPOSITIONS WITH HIGH ELECTRICAL RESISTANCE FOR FUEL CELL ASSEMBLIES

CROSS-REFERENCE TO RELATED APPLICATIONS

This application claims the benefit under 35 U.S.C. § 119(e) of U.S. Provisional Application No. 60/358,201, filed Feb. 19, 2002.

FIELD OF THE INVENTION

The present invention relates generally to heat transfer compositions. More particularly, the present invention relates to heat transfer compositions with high electrical resistance for use in power-generating equipment or in engines. Such compositions are particularly useful in fuel cell assemblies.

BACKGROUND OF THE INVENTION

Heat transfer fluids (e.g., coolants) for internal combustion engines ("ICEs") are known. Such fluids commonly contain about 50% water and 50% ethylene glycol (by weight) with trace amounts of additives, including corrosion inhibitors. However, the ICE may be obsolete within the coming decades. Fuel cells have emerged as a potential replacement. In general, a fuel cell is an electrochemical device that converts the chemical energy of a fuel into electrical energy. They provide several advantages over ICE. Fuel cells are more efficient in extracting energy from fuel (e.g., 60-70% efficiency as compared to 40% for turbodiesel engines and 30% for gasoline engines). Further, fuel cells are quiet and produce negligible emissions of pollutants. Also, the primary fuel source for the fuel cell is hydrogen, which is more readily available than ICE fuel sources (e.g., gasoline). However, replacement of the ICE with fuel cells may require the concomitant replacement of known heat transfer fluids.

Typically, a fuel cell consists of an anode (a positively charged electrode), a cathode (a negatively charged electrode) and an electrolyte in between the two electrodes. Each electrode is coated with a catalyst layer. At the anode, a fuel, such as hydrogen, is converted catalytically to form cations, which migrate through the electrolyte to the cathode. At the cathode, an oxidant, such as oxygen, reacts at the catalyst layer to form anions. The reaction between anions and cations generates a reaction product, electricity and heat.

The current produced in a fuel cell is proportional to the size (area) of the electrodes. A single fuel cell typically produces a relatively small voltage (approximately 1 volt). To produce a higher voltage, several fuel cells are connected, either in series or in parallel, through bipolar plates separating adjacent fuel cells (i.e., "stacked"). As used herein, a fuel cell assembly refers to an individual fuel cell.

The most common fuel and oxidant used in fuel cells are hydrogen and oxygen. In such fuel cells, the reactions taking place at the anode and cathode are represented by the equations:

Anode reaction: $H_2 \rightarrow 2H^+ + 2e^-$     (1)

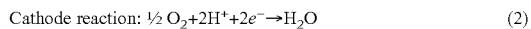

Cathode reaction: $\frac{1}{2} O_2 + 2H^+ + 2e^- \rightarrow H_2O$     (2)

The oxygen used in fuel cells comes from air. The hydrogen used can be in the form of hydrogen gas or a "reformed" hydrogen. Reformed hydrogen is produced by a reformer, an optional component in a fuel cell assembly, whereby hydrocarbon fuels (e.g., methanol, natural gas, gasoline or the like) are converted into hydrogen. The reformation reaction produces heat, as well as hydrogen.

Currently, there are five types of fuel cells, categorized by their electrolyte (solid or liquid), operating temperature, and fuel preferences. The categories of fuel cells include: proton exchange membrane fuel cell ("PEMFC"), phosphoric acid fuel cell ("PAFC"), molten carbonate fuel cell ("MCFC"), solid oxide fuel cell ("SOFC") and alkaline fuel cell ("AFC").

The PEMFC, also known as polymer electrolyte membrane fuel cell, uses an ion exchange membrane as an electrolyte. The membrane permits only protons to pass between the anode and the cathode. In a PEMFC, hydrogen fuel is introduced to the anode where it is catalytically oxidized to release electrons and form protons. The electrons travel in the form of an electric current through an external circuit to the cathode. At the same time, the protons diffuse through the membrane to the cathode, where they react with oxygen to produce water, thus completing the overall process. PEMFC's operate at relatively low temperatures (about 200° F.). A disadvantage to this type of fuel cell is its sensitivity to fuel impurities.

The PAFC uses phosphoric acid as an electrolyte. The operating temperature range of a PAFC is about 300-400° F. Unlike PEMFC's, PAFC's are not sensitive to fuel impurities. This broadens the choice of fuels that they can use. However, PAFC's have several disadvantages. One disadvantage is that PAFC's use an expensive catalyst (platinum). Another is that they generate low current and power in comparison to other types of fuel cells. Also, PAFC's generally have a large size and weight.

The MCFC uses an alkali metal carbonate (e.g., $Li^+$, $Na^+$ or $K^+$) as the electrolyte. In order for the alkali metal carbonate to function as an electrolyte, it must be in liquid form. As a result, MCFC's operate at temperatures of about 1200° F. Such a high operating temperature is required to achieve sufficient conductivity of the electrolyte. It allows for greater flexibility in the choice of fuels (i.e., reformed hydrogen), but, at the same time, enhances corrosion and the breakdown of cell components.

The SOFC uses a solid, nonporous metal oxide as the electrolyte, rather than an electrolyte in liquid form. SOFC's, like MCFC's, operate at high temperatures, ranging from about 700 to about 1000° C. (1290 to 1830° F.). The high operating temperature of SOFC's has the same advantages and disadvantages as those of MCFC's. An additional advantage of the SOFC lies in the solid state character of its electrolyte, which does not restrict the configuration of the fuel cell assembly (i.e., an SOFC can be designed in planar or tubular configurations).

The final type of fuel cell, known as AFC, uses an aqueous solution of alkaline potassium hydroxide as the electrolyte. Their operating temperature is from about 150 to about 200° C. (about 300-400° F.). An advantage to AFC's is that the cathode reaction is faster in alkaline electrolytes than in acidic electrolytes. However, the AFC is very susceptible to contamination, so it requires pure reactants, i.e., pure hydrogen and oxygen.

In general, the reactions that take place within the fuel cell assembly (i.e., the electrochemical reaction and the reformation reaction) are exothermic. However, the catalyst employed in these reactions is sensitive to heat. To perform optimally, fuel cells should be maintained at a certain temperature that is nearly uniform across each cell in the stack. For example, at high temperatures, the catalyst may be destroyed, while at low temperatures, ice may form within the fuel cell assembly. Thus, to accommodate such temperature requirements, heat transfer compositions are needed.

Known heat transfer compositions are not amenable for use in fuel cell assemblies. Conventional heat transfer fluids contain corrosion inhibitors, which are generally metal or organic acid salts. Such salts exist as ions in solution. The presence of significant amounts of positive and negative ions in solution provides a path for a "stray electrical current." Such stray current must be limited for several reasons. First, it may cause electrical shock hazards to the fuel cell operator. Second, such stray current may generate highly explosive hydrogen gas in the cooling system from hydrolysis. Lastly, a significant portion of the electricity generated by the fuel cell may be shorted through the fluid, rather than going to power production, thereby decreasing the efficiency of the fuel cell assembly. Thus, heat transfer fluids used in a fuel cell application must have lower electrical conductivities (i.e., higher electrical resistance) than those used in an ICE application.

In addition to electrical resistivity, there are additional considerations involved in the development of fuel cell heat transfer fluids. One consideration relates to their application. Fuel cell heat transfer fluids in an automotive application will likely be exposed to metals different from those in an ICE. For example, fuel cell assemblies are expected to contain stainless steel, some aluminum alloys, specially coated aluminum and insulating polymers, whereas ICE contain cast iron, steel, brass, solder and copper. Thus, the fuel cell heat transfer fluids must accommodate different types of metals. Another consideration relates to the physical properties of the heat transfer fluid. In fuel cells, the heat transfer fluid must be able to flow through the assembly in order to maintain uniform temperature across the catalyst layer. This depends on the heat transfer fluid's freezing point, vapor pressure, viscosity, pumpability and laminar flow. In addition to these properties, the ability of the heat transfer fluid to adsorb gases affects the conductivity of the heat transfer fluid. As a final consideration, fuel cell heat transfer fluids, like known heat transfer fluids, must be cost effective.

In general, water or deionized water have been used as the heat transfer fluid in fuel cell applications. See, U.S. Pat. Nos. 5,252,410; 4,344,850; 6,120,925; and 5,804,326. However, there are several disadvantages to using water as a fuel cell heat transfer fluid. First, a fuel cell may be exposed to extremes in environmental conditions, e.g., broad ranges in temperatures. For example, when the operating temperature of the fuel cell falls below the freezing point of water, the volumetric expansion of water may cause severe damage to the fuel cell. In addition, water may be corrosive to the different metals that are used in fuel cell applications. As a result, inorganic and/or organic inhibitors would be needed to provide long term corrosion protection. However, such inhibitors may change the electrical resistance of the heat transfer fluid. Lastly, the electrical conductivity of water may change over time as a result of accumulating degradation contaminates, by-products, and rust. Each of the above is detrimental to fuel cell performance.

Efforts at maintaining the temperature above the freezing point of the water heat transfer fluid have focused on the design of the fuel cell assembly. For example, U.S. Pat. No. 6,248,462 B1 ("the '462 patent") discloses a fuel cell stack that contains a cooler plate interspersed throughout the fuel cell stack. The cooler plate circulates an antifreeze solution through its channels. Such cooler plate prohibits the diffusion of antifreeze into the rest of the fuel cell stack. While the cooler plate addresses the first problem associated with using water as a heat transfer fluid, it fails to obviate them all. Moreover, the addition of such a cooler plate to the fuel cell stack increases the overall weight and volume of the fuel cell stack.

Efforts to address these shortcomings have focused on the development of fuel cell assemblies that accommodate known antifreezes. For example, U.S. Pat. No. 6,316,135 B1 and International Publication No. WO 01/47052 A1 disclose a fuel cell assembly using only antifreeze as the heat transfer fluid. Such fuel cell assemblies contain certain "wetproofed," i.e., substantially hydrophobic, components. The design of these assemblies prevents the antifreeze from contaminating the electrolyte and the catalyst, thereby eliminating the need to isolate the antifreeze from the components of the fuel cell assembly (e.g., in a cooler plate). As a result, fuel cell stacks can be made having lower weight and volume than those disclosed in the '462 patent. However, such fuel cell assemblies have several problems, including antifreeze contamination and reduced cooling effectiveness caused by the wetproofed materials.

New heat transfer fluids have also been developed. For example, each of U.S. Pat. Nos. 5,868,105; 6,101,988; 6,053,132; and 6,230,669 disclose a heat transfer fluid that is a substantially anhydrous, boilable liquid having a saturation temperature higher than that of water. The disclosed heat transfer fluids have a minimum content of water, for example, less than 5% by weight. An example of one such heat transfer fluid is propylene glycol with additives to inhibit corrosion. The use of propylene glycol as a heat transfer fluid suffers limitations. One important limitation lies in its viscosity. At low temperatures, propylene glycol is highly viscous. This reduces its flow through the fuel cell assembly, and consequently, its heat removal efficiency. The end result is a decrease in the efficiency of the fuel cell assembly.

Mixtures of water and alcohols have also been used as fuel cell heat transfer fluids. See, e.g., Japanese Patent Laying-Open Gazette No. 7-185303. Such mixtures suffer from deficiencies resulting from solvent vaporization. Alcohols, like methanol, may cause some of the heat transfer fluid to vaporize into the cooling layer. Such vaporization raises the pressure of the cooling layer, thereby preventing the heat transfer fluid from flowing at a constant rate through the fuel cell assembly. This effects the ability of the heat transfer fluid to maintain a uniform temperature across the catalyst layer.

Other fuel cell heat transfer fluids have also been used. For example, water-glycol mixtures, Thenninol D-12 (which is a hydrotreated heavy naphtha (petroleum)) and dielectric fluids (e.g., mineral oils and silicone oils) have been used in fuel cells. See, e.g., U.S. Pat. Nos. 5,565,279; 5,252,410; 5,804,326; and 6,218,038. The fuel cell heat transfer fluid disclosed in International PCT Publication WO 01/23495 comprises water, glycol and corrosion inhibitors. Each of the heat transfer fluids above has deficiencies, including flammability and increased conduction (i.e., reduced resistivity).

Thus, there remains a need for a heat transfer fluid composition that resists corrosion, freezing, vaporization and gas adsorption, while at the same time, provides long lasting performance and high electrical resistance.

SUMMARY OF THE INVENTION

One objective of this invention is to provide a heat transfer composition for use in fuel cell assemblies.

It is another objective of this invention to provide a heat transfer composition for use in fuel cell assemblies with high electrical resistance.

It is another objective of this invention to provide a heat transfer composition for fuel cell assembly with electrical resistance greater than about 5 KΩ·cm.

It is another objective of this invention to provide a heat transfer composition that confers corrosion protection.

It is another objective of this invention to provide a heat transfer composition that confers freezing protection.

DETAILED DESCRIPTION

In order that this invention may be more fully understood, the following detailed description is set forth. However, the detailed description is not intended to limit the inventions that are described by the claims.

The present invention provides heat transfer compositions for use in fuel cell assemblies. More particularly, the present invention provides heat transfer compositions for use in fuel cell assemblies comprising:

(a) from about 0% to about 90% by weight alcohol;
(b) from about 1% to about 90% by weight polyalkylene oxide;
(c) from about 0% to about 50% additive by weight;
(d) balance being water.

Such heat transfer compositions are particularly well suited for use in fuel cell assemblies to remove assuasive heat and maintain proper operating temperature while providing high electrical resistance.

The first component in the compositions of the present invention is alcohol. Suitable alcohols include monohydric or polyhydric alcohols and mixtures thereof. Preferred alcohols are methanol, ethanol, propanol, butanol, furfurol, tetrahydrofurfuryl alcohol ("THFA"), ethoxylated furfuryl, ethylene glycol, diethylene glycol, triethylene glycol, 1,2 propylene glycol, 1,3 propylene glycol, dipropylene glycol, butylene glycol, glycerol, monoethylether of glycerol, dimethyl ether of glycerol, sorbitol, 1,2,6-hexanetriol, trimethylolpropane, alkoxy alkanols (such as methoxyethanol) and mixtures thereof. More preferably, the alcohol is ethylene glycol, 1,2-propylene glycol, 1,3-propylene glycol, glycerol, tetrahydrofurfuryl alcohol and mixtures thereof.

The alcohol is present in the composition in an amount of about 0% to about 90% (by weight), and preferably, about 20% to about 80%. More preferably, the alcohol is present in an amount of about 30% to about 70%, and even more preferably, about 40% to about 60%.

The second component in the compositions of the present invention is a polyalkylene oxide. Polyalkylene oxides useful in the compositions of the present invention have an average molecular weight from about 55 to about 380,000, and more preferably from about 135 to about 10,000.

Suitable polyalkylene oxides are polyoxyethylene ("EO"), oxypropylene ("PO"), oxybutylene ("BO") polymers and mixtures thereof. Preferably, the polyalkylene oxide is a copolymer of EO and PO polymers having a weight ratio of EO to PO from about 1:100 to about 100:1, preferably from about 1:3 to about 3:1. More preferably, the polyalkylene oxide is UCON LB-135, UCON LB-165-Y24, UCON LB-165Y3, UCON LB-165, UCON 1281, UCON LB-65, UCON 50-HB-55, UCON 50-HB-260, UCON 50-HB-100, UCON 50-HB-5100, UCON 75-H-1400, UCON 75-H-90,000, UCON 50-HB-260-Y3, UCON HTF 500, LB165 Y24, LB165Y3; H1400, HB-100, HB-260, 50-HB-260-Y3, SYN-ALOX®, Polyglycol E200, Polyglycol E300, Polyglycol E400, Polyglycol E600, Polyglycol E900, Polyglycol E1000, Polyglycol E1450, Polyglycol E3350, Polyglycol E4500, Polyglycol E8000, Polyglycol E300NF, Polyglycol E400NF, Polyglycol E600NF, Polyglycol E900NF, Polyglycol E1000NF, Polyglycol E1450NF, Polyglycol E3350NF, Polyglycol E4500NF, Polyglycol E8000NF, MPEG 350, MPEG 550, MPEG 750, Polyglycol P-425, Polyglycol P-1200, Polyglycol P-200, Polyglycol P-4000, Polyglycol L-910, Polyglycol L-1150, Polyglycol 112-2, Polyglycol 15-200, Polyglycol EP530, Carbowax PEG 200, Carbowax PEG 300, Carbowax PEG 400, Carbowax PEG 540 Blend, Carbowax PEG 600, Carbowax PEG 900, Carbowax PEG 1000, Carbowax PEG 1450, Carbowax PEG 3500, Carbowax PEG 4600, Carbowax PEG 8000, Carbowax PEG 300 Sentry, Carbowax PEG 400 Sentry, Carbowax PEG 600 Sentry, Carbowax PEG 900 Sentry, Carbowax PEG 1000 Sentry, Carbowax PEG 1450 Sentry, Carbowax PEG 3350 Sentry, Carbowax PEG 4600 Sentry, Carbowax PEG 8000 Sentry, Carbowax MEG 350, Carbowax MEG 550, Carbowax MEG 750, Polypropylene Glycol 425, Polypropylene Glycol 1025 and Polypropylene Glycol 2025 from Union Carbide/Dow Chemical, PLURACOL E200, PLURACOL E300, PLURACOL E400, PLURACOL E600, PLURACOL E1000, PLURACOL E1450, PLURACOL E2000, PLURACOL E4000, PLURACOL E4500, PLURACOL E8000, PLURACOL P410, PLURACOL P1010, PLURACOL P2010, PLURACOL P4010 and Pluronic L-92 from BASF, POLY-G 200, POLY-G 300, POLY-G 400, POLY-G B1530, POLY-G 600, POLY-G 1000, POLY-G 1500, POLY-G 2000, POLY-G 300NF, POLY-G 400NF, POLY-G 600NF, POLY-G D400, POLY-G D1200, and POLY-G D2000 from Olin; Silwet L-7200, Silwet L-7230, Silwet L-7600, Silwet L-7604, Silwet L-7607, Silwet L-7657, Silwet L-7650, Silwet L-7664, Silwet L-8600, Silwet L-8620, Silwet L-77, Formasil 891, Formasil 593, Formasil 433, or Formasil 891 from Osi Specialties; or TBF-190 from Path Silicones, Inc.

Even more preferably, the polyalkylene oxide is UCON LB-135, UCON LB-165-Y24, UCON LB-165Y3, UCON LB-165, UCON 1281, UCON LB-65, UCON 50-HB-55, UCON 50-HB-260, UCON 50-HB-100, UCON 50-HB-5100, UCON 75-H-1400, UCON 75-H-90,000, UCON 50-HB-260-Y3, UCON HTF 500, LB165 Y24, LB165Y3; H1400, HB-100, HB-260, 50-HB-260-Y3, Pluronic L-92, Polyglycol P-425, Formasil 433, Formasil 891, Silwet L-7200, Silwet L-7230, Silwet L-7600, Silwet L-7604, Silwet L-7607, Silwet L-7657, Silwet L-7650, Silwet L-7664, Silwet L-8600, Silwet L-8620, Silwet L-77 or TBF-190.

The polyalkylene oxide is present in the composition in an amount of about 1% to about 90% (by weight), and preferably, about 2% to about 75%. More preferably, the polyalkylene oxide is present in an amount of about 3% to about 50%, and even more preferably, about 5% to about 25% (by weight).

Preferably, the weight ratio of alcohol to polyalkylene oxide is about 3:1, and more preferably about 5:1, and even more preferably about 15:1.

The third component in the compositions of the present invention is one or more additives. Such additives include, dielectric fluids [e.g., mineral, synthetic, and silicone fluids (e.g., Armul series from Witco Corporation) or oils and mixture thereof]; wetting agents (Rhodafac PL-6 from Rhodia); surfactants (e.g, Mazon RI or 14a series from BASF; Deriphat series from Henkel Chemical; Rhodameen T-15, Miranol CS Conc, Mirapol WT, Mirataine H2C-HA and Miramine TO-DT from Rhodia); antifoam and/or lubricants (e.g., polysiloxanes and polydimethylsiloxanes, Rhodafac PA-32, Lubrophos RD-570 and Lubrophos LB-400 from Rhodia; TBA4456 from Path Silicones, Inc.); solvents (e.g., Exxsol series from ExxonMobil); and corrosion inhibitors (TBF-77A and TBF-193 from Path Silicones, Inc.) and other additives known in the art that do not adversely affect the fuel cell assembly by reduction of electrical resistance.

The additive is present in the composition in an amount of about 0% to about 50% (by weight), and preferably about 1% to about 30%. Even more preferably, the additive is present in an amount about 2% to about 20%, and yet even more preferably, about 3% to about 10%.

Preferred compositions of this invention are described below.

One preferred composition comprises:
(a) from about 20% to about 80% by weight of an alcohol;
(b) from about 2% to about 75% by weight of a polyalkene oxide;
(c) from about 1% to about 30% by weight of an additive; and
(d) balance being water.

A more preferred compositions comprises:
(a) from about 30% to about 70% by weight of an alcohol;
(b) from about 3% to about 50% by weight of a polyalkene oxide; and
(c) from about 2% to about 20% by weight of an additive; and
(d) balance being water.

An even more preferred composition comprises:
(a) from about 40% to about 60% by weight of an alcohol;
(b) from about 5% to about 25% by weight of a polyalkene oxide;
(c) from about 3% to about 10% by weight of an additive; and
(d) balance being water.

According to one embodiment, the heat transfer compositions of the present invention provide high electrical resistance. Such heat transfer compositions have electrical resistivity values greater than about 5 KΩ·cm.

According to another embodiment, the heat transfer compositions of the present invention resist corrosion, freezing, vaporization and gas adsorption, while at the same time, provide long lasting performance without a change in electrical resistance.

The heat transfer compositions of the present invention can be prepared as concentrates. Such concentrates can be diluted with water.

The present invention also provides fuel cell systems comprising one or more fuel cell assemblies and a heat transfer composition of the present invention. Such fuel cell assemblies are selected from the group consisting of PEMFC, PAFC, MCFC, SOFC and AFC.

The present invention further provides methods for removing heat from a fuel cell assembly. Such methods comprise the step of contacting the fuel cell assembly, either directly or indirectly, with a heat transfer composition of the present invention. Such fuel cell assembly is selected from the group consisting of from PEMFC, PAFC, MCFC, SOFC and AFC.

In order that this invention may be better understood, the following examples are set forth.

EXAMPLES 138 different heat transfer compositions were prepared (Examples 1-138). The components of these compositions are described in Tables 1-23 below. The abbreviations used in the tables below are as follows: Component A is alcohol, Component B is polyalkylene oxide, Component C is additive, Component D is water, EG is ethylene glycol, PG is propylene glycol, G is glycerol and THFA is tetrahydrofurfuryl alcohol.

TABLE 1

| Component (wt %) | Example No. | | | | | |
|---|---|---|---|---|---|---|
| | 1 | 2 | 3 | 4 | 5 | 6 |
| Water | | 25 | 50 | | 25 | 75 |
| Inorganic Antifreeze[1] | 100 | 75 | 50 | | | |
| Organic Antifreeze[2] | | | | 100 | 75 | 50 |
| Electrical Resistance (KΩ·cm) | 1.7 | 0.7 | 0.4 | 13 | 0.5 | 0.3 |

[1]GM-4043M
[2]Havoline Extended Life Coolant

TABLE 2

| Component (wt %) | Example No. | | | | | |
|---|---|---|---|---|---|---|
| | 7 | 8 | 9 | 10 | 11 | 12 |
| A  EG | | | 100 | 75 | 60 | 50 |
| A  PG | | | | | | 100 |
| D  Water | 100 | | 25 | 40 | 50 | |
| Electrical Resistance (MΩ·cm) | 0.9 | 5.9/2.2[1] | 2.4 | 2.0 | 1.2 | 50/7.3[1] |

[1]Resistance at 80° C.

TABLE 3

| Component (wt %) | Example No. | | | | | |
|---|---|---|---|---|---|---|
| | 13 | 14 | 15 | 16 | 17 | 18 |
| A  PG | 75 | 60 | 50 | | | |
| A  1,3 Propanediol | | | | 100 | 75 | 60 |
| D  Water | 25 | 40 | 50 | | 25 | 40 |
| Electrical Resistance (MΩ·cm) | 3.6 | 2.2 | 1.1 | 33.3/11[1] | 11.3 | 6.0 |

[1]Resistance at 80° C.

TABLE 4

| Component (wt %) | Example No. | | | | | |
|---|---|---|---|---|---|---|
| | 19 | 20 | 21 | 22 | 23 | 24 |
| A  1,3 Propanediol | 50 | | | | | |
| A  G | | 100 | 75 | 60 | 50 | 50 |
| A  PG | | | | | | 50 |
| D  Water | 50 | | 25 | 40 | 50 | |
| Electrical Resistance (MΩ·cm) | 2.0 | 100 | 25/2.6[1] | 15 | 5.7 | 100 |
| after ASTM D1384 | | | | 1.0 | | |

[1]Resistance at 80° C.

TABLE 5

| Component (wt %) | Example No. | | | | | |
|---|---|---|---|---|---|---|
| | 25 | 26 | 27 | 28 | 29 | 30 |
| A  G | 25 | | 25 | | | |
| A  PG | 25 | 25 | | | | |
| A  EG | | 25 | 25 | 50 | | |
| B  UCON LB-135 | | | | | 100 | |
| B  UCON LB-165-Y24 | | | | | | 100 |
| B  UCON LB-165Y3 | | | | | | 100 |
| D  Water | 50 | 50 | 25 | | | |
| Electrical Resistance (MΩ·cm) | 2.3 | 3.0/1.0[1] | 4.9 | >100 | >100 | >100 |

[1]Resistance at 80° C.

TABLE 6

| Component (wt %) | | 31 | 32 | 33 | 34 | 35 | 36 |
|---|---|---|---|---|---|---|---|
| B | UCON LB-165 | 100 | | | | | |
| B | UCON 1281 | | 100 | | | | |
| B | UCON LB-65 | | | 100 | | | |
| B | UCON 50-HB-55 | | | | 100 | 75 | 60 |
| D | Water | | | | | 25 | 40 |
| Electrical Resistance (MΩ·cm) | | >100 | >100 | >100 | 25 | 1.6 | 0.5 |

TABLE 7

| Component (wt %) | | 37 | 38 | 39 | 40 | 41 | 42 |
|---|---|---|---|---|---|---|---|
| B | UCON 50-HB-55 | 50 | | | | | |
| B | UCON 50-HB-260 | | 100 | 75 | 60 | 50 | |
| B | UCON 50-HB-100 | | | | | | 100 |
| D | Water | 50 | | 25 | 40 | 50 | |
| Electrical Resistance (MΩ·cm) | | 0.3 | >100 | 3.7 | 0.7 | 0.3 | 100 |

TABLE 8

| Component (wt %) | | 43 | 44 | 45 | 46 | 47 | 48 |
|---|---|---|---|---|---|---|---|
| B | UCON 50-HB-100 | 75 | 60 | 50 | | | |
| B | UCON 50-HB-5100 | | | | 100 | 75 | 60 |
| D | Water | 25 | 40 | 50 | | 25 | 40 |
| Electrical Resistance (MΩ·cm) | | 4.0 | 0.7 | 0.3 | 100 | 1.5 | 0.2 |

TABLE 9

| Component (wt %) | | 49 | 50 | 51 | 52 | 53 | 54 |
|---|---|---|---|---|---|---|---|
| B | UCON 50-HB-5100 | 50 | | | | | |
| B | UCON 75-H-1400 | | 100 | 75 | 60 | 50 | |
| B | UCON 75-H-90,000 | | | | | | 100 |
| D | Water | 50 | | 25 | 40 | 50 | |
| Electrical Resistance (MΩ·cm) | | 0.06 | 100 | 9.1 | 3.1 | 1.4 | 100 |

TABLE 10

| Component (wt %) | | 55 | 56 | 57 | 58 | 59 | 60 |
|---|---|---|---|---|---|---|---|
| C | Polydimethysiloxane | 100 | | | | | |
| C | Octamethyltrsiloxane | | 36 | | | | |
| C | Decamethyltetrasiloxane | | 28 | | | | |
| C | Dodecamethyl-pentasiloxane | | 17 | | | | |
| C | Polydimethylsiloxane | | 17 | | | | |
| C | Vegetable Oil | | | 100 | | | |
| C | Soybean Oil | | | | 100 | | |
| C | Corn Oil | | | | | 100 | |
| C | Castrol Oil | | | | | | 100 |
| Electrical Resistance (MΩ·cm) | | >100 | >100 | >100 | >100 | >100 | >100 |

TABLE 11

| Component (wt %) | | 61 | 62 | 63 | 64 | 65 | 66 |
|---|---|---|---|---|---|---|---|
| A | G | | | | | 50 | 25 |
| A | EG | | | | | 25 | 50 |
| B | LB165 Y24 | | | | | 44 | |
| B | LB165 Y3 | | | | | 16 | |
| B | H1400 | | | | | 5 | 5 |
| C | Petroleum Oil | 100 | | | | | |
| C | Cottonseed Oil | | 100 | | | | |
| C | Pine Oil | | | 100 | | | |
| C | Soybean oil | | | | 40 | | |
| D | Water | | | | 20 | 20 | |
| Electrical Resistance (MΩ·cm) | | >100 | >100 | >100 | >100 | 11.1 | 5.9 |
| after ASTM D1384 | | | | | | 100 | 0.2 | 0.2 |

TABLE 12

| Component (wt %) | | 67 | 68 | 69 | 70 | 71 | 72 |
|---|---|---|---|---|---|---|---|
| A | EG | | | | | | |
| A | G | | | | | | |
| A | PG | 20 | | | | | |
| B | H1400 | | | | | | |
| B | HB-100 | 40 | | | | | |
| B | HB-260 | 20 | | | | | |
| B | UCON 50-HB-260-Y3 | | 100 | 75 | 60 | | |
| B | UCON HTF 500 | | | | | 100 | 75 |
| D | Water | 20 | | 25 | 40 | | 25 |
| Electrical Resistance (MΩ·cm) | | 6.3 | >100 | 9.1 | 3.4 | 8.3 | |
| after ASTM 01384 | | 1.0 | | | | | |

TABLE 13

| Component (wt %) | | 73 | 74 | 75 | 76 | 77 | 78 |
|---|---|---|---|---|---|---|---|
| A | THFA | | 100 | | | | |
| B | UCON HTF 500 | 60 | | | | | |
| B | Pluronic L-92 | | | | 100 | 50 | |
| C | Mazon RI-4a | | | 100 | | | |
| C | Syltherm XLT | | | | | | 100 |
| D | Water | 40 | | | | 50 | |
| Electrical Resistance (MΩ·cm) | | 1.9 | 2.0 | 0.008 | >100 | 0.1 | >100 |

TABLE 14

| Component (wt %) | | 79 | 80 | 81 | 82 | 83 | 84 |
|---|---|---|---|---|---|---|---|
| C | Syltherm XLT | 50 | | | | | |
| C | Syltherm 800 | | 100 | 50 | | | |
| C | Rhodafac PL-6 | | | | 100 | 50 | |
| C | Rhodafac PA-32 | | | | | | 100 |
| D | Water | 50 | | 50 | | 50 | |
| Electrical Resistance (MΩ·cm) | | 1.0 | >100 | 11.1 | 0.2 | 0.04 | 0.5 |

TABLE 15

| Component (wt %) | | 85 | 86 | 87 | 88 | 89 | 90 |
|---|---|---|---|---|---|---|---|
| C | Rhodameen T-15 | 100 | | | | | |
| C | Deriphat 151C | | 100 | | | | |
| C | Lubrhophos RD-510 | | | 100 | | | |
| C | Lubrhophos LB-400 | | | | 100 | | |
| C | Exxsol D 130 | | | | | 100 | 50 |
| D | Water | | | | | | 50 |
| Electrical Resistance (MΩ·cm) | | 1.3 | 0.3 | 0.4 | 0.5 | >100 | 0.6 |

TABLE 16

| Component (wt %) | | 91 | 92 | 93 | 94 | 95 | 96 |
|---|---|---|---|---|---|---|---|
| B | Polyglycol P-425 | 100 | 50 | | | | |
| B | Formasil 433 | | | 100 | 50 | | |
| B | Formasil 891 | | | | | 100 | 50 |
| D | Water | | 50 | | 50 | | 50 |
| Electrical Resistance (MΩ·cm) | | 100 | 0.05 | >100 | 1.2 | 1.3 | 0.03 |

TABLE 17

| Component (wt %) | | 97 | 98 | 99 | 100 | 101 | 102 |
|---|---|---|---|---|---|---|---|
| B | Formasil 593 | 100 | | | | | |
| B | Silwet L-7200 | | 100 | | | | |
| B | Silwet L-7230 | | | 100 | | | |
| B | Silwet L-7600 | | | | 100 | 50 | |
| B | Silwet L-7657 | | | | | | 100 |
| D | Water | | | | | 50 | |
| Electrical Resistance (MΩ·cm) | | >100 | >100 | >100 | 100 | 0.2 | 1.4 |

TABLE 18

| Component (wt %) | | 103 | 104 | 105 | 106 | 107 | 108 |
|---|---|---|---|---|---|---|---|
| B | Sliwet L-7657 | 50 | | | | | |
| B | Silwet L-7650 | | 100 | 50 | | | |
| B | Siwet L-77 | | | | 100 | 50 | |
| D | Water | 50 | | 50 | | 50 | 100 |
| Electrical Resistance (MΩ·cm) | | 0.03 | 100 | 0.4 | 1.2 | 0.1 | 0.4 |

TABLE 19

| Component (wt %) | | 109 | 110 | 111 | 112 | 113 | 114 |
|---|---|---|---|---|---|---|---|
| A | EG | 70 | 70 | 70 | 70 | 70 | 70 |
| B | Pluronic L-92 | 5 | | | | | |
| B | Polyglycol P425 | | | | | | 5 |
| C | Syltherm XLT | | 5 | | | | |
| C | Syltherm 800 | | | 5 | | | |
| C | Rhodafac PL-6 | | | | 5 | 5 | |
| C | Exxsol D130 | | | | | | |

TABLE 19-continued

| Component (wt %) | | 109 | 110 | 111 | 112 | 113 | 114 |
|---|---|---|---|---|---|---|---|
| D | Water | 25 | 25 | 25 | 25 | 25 | 25 |
| Electrical Resistance (MΩ·cm) | | 1.5 | 1.5 | 2.1 | 0.03 | 1.6 | 0.8 |

TABLE 20

| Component (wt %) | | 115 | 116 | 117 | 118 | 119 | 120 |
|---|---|---|---|---|---|---|---|
| A | EG | 70 | 70 | 70 | 70 | | |
| A | THFA | | | | | 10 | 10 |
| B | Formasil 433 | 5 | | | | | |
| B | Silwet L-7600 | | 5 | | | | |
| B | Silwet L-7650 | | | 5 | | | |
| B | Silwet L-77 | | | | 5 | | |
| B | 50-HB-260-Y3 | | | | | 45 | 50 |
| D | Water | 25 | 25 | 25 | 25 | 45 | 40 |
| Electrical Resistance (MΩ·cm) | | 1.6 | 1.0 | 1.8 | 1.0 | 0.7 | 1.1 |

TABLE 21

| Component (wt %) | | 121 | 122 | 123 | 124 | 125 | 126 |
|---|---|---|---|---|---|---|---|
| A | THFA | 30 | | | | | |
| A | 1,3 Propanediol | | 75 | 70 | | | |
| A | EG | | | | 73.5 | 73.5 | 73.5 |
| B | 50-HB-260-Y3 | 30 | | 5 | | | |
| B | Formasil 433 | | | | 4.4 | | |
| B | Silwet 7650 | | | | | 4.4 | 4.4 |
| C | Syltherm XLT | | | | 4.4 | | |
| D | Water | 40 | 25 | 25 | 22.4 | 22.4 | 22.4 |
| Electrical Resistance (MΩ·cm) | | 8.5 | 11.6 | 7.9 | 2.4 | 2.4 | 1.2 |
| After ASTM D-1384 | | | 1.1 | 0.8 | 0.04 | 0.04 | 1.0 |

TABLE 22

| Component (wt %) | | 127 | 128 | 129 | 130 | 131 | 132 |
|---|---|---|---|---|---|---|---|
| A | EG | | 67 | 70 | 70 | 70 | 70 |
| A | PG | 67 | | | | | |
| B | TBF-190 | | | 5 | | | |
| C | TBF-193 | | | | 5 | | |
| C | TBF-77A | | | | | 5 | |
| C | TBA-4456 | | | | | | 5 |
| D | Water | 33 | 33 | 25 | 25 | 25 | 25 |
| Electrical Resistance (MΩ·cm) | | nt | nt | 0.8 | 0.6 | 2.1 | 0.2 |

TABLE 23

| Component (wt %) | | 133 | 134 | 135 | 136 | 137 | 138 |
|---|---|---|---|---|---|---|---|
| A | EG | 74.99 | 70 | 70 | 70 | 70 | 70 |
| B | Silwet L-7604 | | 5 | | | | |
| B | Silwet L-7664 | | | 5 | | | |
| B | Sliwet L-7607 | | | | 5 | | |
| B | Silwet L-8600 | | | | | | 5 |

TABLE 23-continued

| Component (wt %) | 133 | 134 | 135 | 136 | 137 | 138 |
|---|---|---|---|---|---|---|
| B Silwet L-8620 | | | | | | |
| C TBA-4456 | 0.01 | | | | | 5 |
| D Water | 25 | 25 | 25 | 25 | 25 | 25 |
| Electrical Resistance (MΩ·cm) | 2.2 | 1.4 | 0.8 | 1.6 | 0.7 | 1.0 |

Measurement of Solution Resistance

Electrical resistivity, R, is defined in ASTM standard D 1125, as the ac resistance in ohms measured between opposite faces of a centimeter cube of an aqueous solution at a specified temperature. Electrical resistivity is measured by applying an ac drive voltage between parallel platinum plates of known surface area and separation distance and measuring the resistance of the solution. The actual resistance of the cell, $R_x$, is represented by the formula:

$$R_x = R \cdot L/A$$

where L is the separation distance of the plates in cm, A is the cross sectional area of the plates in $cm^2$ and R is the resistivity of the fluid in MΩ·cm. Resistivity values greater than about 5 KΩ·cm are considered acceptable for fuel cell applications.

Solution resistivity measurements were made using a Traceable© Bench Conductivity Meter 4163 with a glass platinum flow through probe. The instrument was calibrated to NIST (National Institute of Standards and Technology) standards. The probe was initially rinsed with deionized ("DI") water, dried and rinsed in the test solution to avoid dilution and contamination of the test solution. The probe was immersed in approximately 50 ml of test solution. Measurements were taken as the probe was moved through the solution in a stirring motion. The stirring motion helps to prevent polarization. Electrical resistivity measurements were made following ASTM test method D 1125.

Tables 1-23 show that the heat transfer compositions of the present invention provide high electrical resistance (i.e., electrical resistance values greater than about 5 KΩ·cm). For example, Examples 35-37, 39-41, 43-45, 47-49, 51-53, 65-67, 69-70, 72-73, 77, 92, 94, 96, 101, 103, 105, 107, 109, 114-121, 123, 125-126, 129, and 134-137 have electrical resistances of about 11.1 to about 0.03 MΩ·cm. In contrast, the control compositions containing inorganic antifreeze (Examples 1-3) or organic antifreeze (Examples 4-6) exhibit low electrical resistances of 1.7 to 0.3 KΩ·cm.

Laboratory Modified ASTM D-1384—"Standard Test Method for Corrosion Test for Engine Coolants in Glassware"

Thirteen heat transfer compositions were prepared and evaluated under the conditions (modified as explained below) set forth by ASTM D1384. See Annual Book of ASTM Standards, section 15, Volume 15.05 (2000), incorporated herein by reference. ASTM D1384 is a standard test method for general corrosion of a variety of metals typically found in the cooling system and/or heating system of internal combustion engines. ASTM D1384 was modified in order to evaluate the metals that will be used in fuel cell assembly. Such metals include stainless steel, aluminum alloys and insulating polymers. ASTM D1384 was further modified so that the test formulations were not diluted with "corrosive water" (i.e., DI water containing 100 ppm each of $SO_4^{-2}$, $HCO_3^-$ and $Cl^-$, all added as $Na^+$ salts) Such dilution accounts for variations in water added to traditional antifreeze concentrates, which may not occur with regard to fuel cell heat transfer fluids.

After preparing the compositions and subjecting them to the test procedures set forth in ASTM D1384 (the metal specimens were immersed for 336 hours in the heat transfer composition and maintained at a temperature of 88° C.), the weight change of the metal specimens were measured (average of duplicate measurements). A negative weight loss signifies a weight increase due to the formation of a protective coating on the metal surfaces. A weight loss of 10 mg for each of copper, brass, steel and cast iron, and 30 mg for each of aluminum and solder is the maximum allowed to pass ASTM D1384.

As shown in Table 24, the heat transfer compositions of the present invention provide general corrosion inhibition for both stainless steel and aluminum. For example, Examples 66-67, 123 and 125-126 exhibited stainless steel weight loss of <0.3 mg and Examples 65-67, 123 and 125 exhibited aluminum weight loss of ≦10 mg. Table 24 also shows that these formulations are effective general corrosion inhibitors for other metals compared to water (Example 7), water/propylene glycol mixture (Example 15 and 127), water/1,3 propanediol mixture (Example 122) and water/ethylene glycol mixture (Example 128) in ASTM D1384.

TABLE 24

Metal Weight Loss (mg) Modified ASTM D1384

| Example No. | Copper | Brass | Steel | Stainless Steel | Cast Iron | Aluminum |
|---|---|---|---|---|---|---|
| 7 | 2 | 5 | 219 | nt | 450 | 110 |
| 15 | −1.4 | −1.1 | 5.3 | nt | 8.7 | −1.0 |
| 15 | −2.3 | −1.8 | nt | −1.3 | nt | 1.4 |
| 64 | 0.2 | −0.6 | −0.4 | nt | −1.1 | −3.5 |
| 64 | −1.9 | −1.2 | nt | −0.7 | nt | −2.6 |
| 65 | 0.9 | 0.1 | 4.3 | nt | 24.8 | −0.4 |
| 66 | −1.4 | −1.2 | nt | −0.1 | nt | 5.5 |
| 67 | 3.6 | 0.6 | 139 | nt | 206 | −2.7 |
| 67 | 0.1 | 0.6 | nt | 0.1 | nt | −3.1 |
| 122 | 2.7 | 1.1 | 7.4 | nt | 145 | 0.6 |
| 122 | 1.4 | 1.0 | nt | −1.3 | nt | 32 |
| 123 | 2.9 | 1.2 | 50 | nt | 145 | 10 |
| 123 | 1.5 | 0.5 | nt | −1.6 | nt | 0.4 |
| 124 | 4.1 | 2.9 | 115 | nt | 254 | 0.3 |
| 124 | 4.1 | 2.2 | nt | 0.0 | nt | 1.8 |
| 125 | 1.5 | 2.7 | 82 | nt | 223 | −1.6 |
| 125 | 2.6 | 0.3 | nt | −0.1 | nt | 1.8 |
| 126 | −3.8 | −1.3 | 10 | nt | 230 | −2.4 |
| 126 | −2.2 | −1.2 | nt | 0.3 | nt | 1.8 |
| 127 | 4 | 5 | 214 | nt | 345 | 15 |
| 128 | 4 | 11 | 974 | nt | 1190 | 165 |

Nt - not tested;
Examples 1, 128 and 129 were tested under ASTM D1384 Test Requirements.

After completion of the modified ASTM D1384 test, electrical resistance was measured for 10 heat transfer compositions (Examples 21, 64-67, 122-126). As shown in Tables 11-12 and 21, the compositions of the present invention provide high electrical resistance even after exposure to different metal surfaces over extended test times. For example, Examples 65-67, 123 and 125-126 exhibit an electrical resistance of about 1 to 0.04 MΩ·cm after the ASTM D1384 test.

We claim:

1. A heat transfer composition, comprising:
    (a) from about 20% to about 80% by weight of an alcohol;
    (b) from about 1% to about 90% by weight of a polyalkylene oxide;

(c) from about 1% to about 30% by weight of an additive; and (d) balance being water;

wherein said composition has an electrical resistance greater than about 5 KΩ·cm and wherein said composition is used in a fuel cell assembly.

2. The heat transfer composition according to claim 1, wherein said composition comprises about 30% to about 70% alcohol.

3. The heat transfer composition according to claim 1, wherein said composition comprises about 40% to about 60% alcohol.

4. The heat transfer composition according to claim 1, wherein said alcohol is selected from the group consisting of methanol, ethanol, propanol, butanol, furfurol, tetrahydrofurfuryl, ethoxylated furfuryl, ethylene glycol, diethylene glycol, triethylene glycol, 1,2 propylene glycol, 1,3 propylene glycol, dipropylene glycol, butylene glycol, glycerol, monoethylether of glycerol, dimethyl ether of glycerol, sorbitol, 1,2,6-hexanetriol, trimethylolpropane, methoxyethanol and mixtures thereof.

5. The heat transfer composition according to claim 1, wherein said alcohol is selected from the group consisting of ethylene glycol, 1,2-propylene glycol, 1,3-propylene glycol, glycerol, tetrahydrofurfuryl alcohol and mixtures thereof.

6. The heat transfer composition according to claim 1, wherein said composition comprises about 3% to about 50% polyalkylene oxide.

7. The heat transfer composition according to claim 1, wherein said composition comprises about 5% to about 25% polyalkylene oxide.

8. The heat transfer composition according to claim 1, wherein said polyalkylene oxide has an average molecular weight from about 55 to about 380,000.

9. The heat transfer composition according to claim 1, wherein said polyalkylene oxide has an average molecular weight from about 135 to about 10,000.

10. The heat transfer composition according to claim 8, wherein said polyalkylene oxide is selected from the group consisting of polyoxyethylene, oxypropylene, oxybutylene polymers and mixtures thereof.

11. The heat transfer composition according to claim 1, wherein said composition comprises about 2% to about 20% additive.

12. The heat transfer composition according to claim 1, wherein said composition comprises about 3% to about 10% additive.

13. The heat transfer composition according to claim 1, wherein said additive is selected from the group consisting of dielectric fluids, wetting agents, antifoam agents, lubricants, surfactants, solvents and corrosion inhibitors.

14. A heat transfer composition comprising:

(a) from about 30% to about 70% by weight of an alcohol;

(b) from about 3% to about 50% by weight of a polyalkylene oxide;

(c) from about 2% to about 20% by weight of an additive; and (d) balance being water; and wherein said composition has an electrical resistance greater than about 5 KΩ·cm and is used in a fuel cell assembly.

15. A heat transfer composition comprising:

(a) from about 40% to about 60% by weight of an alcohol;

(b) from about 5% to about 25% by weight of a polyalkylene oxide;

(c) from about 5% to about 10% by weight of an additive; and (d) balance being water; and wherein said composition has an electrical resistance greater than about 5 KΩ·cm and is used in a fuel cell assembly.

* * * * *